US009700895B2

(12) United States Patent
Guillot et al.

(10) Patent No.: US 9,700,895 B2
(45) Date of Patent: Jul. 11, 2017

(54) USE OF FORMULATIONS CONTAINING GLYCEROL AS A DRY GRINDING AID AGENT OF MINERAL MATTER

(71) Applicant: COATEX, Genay (FR)

(72) Inventors: Murielle Guillot, Caluire et Cuire (FR); Jacques Mongoin, Quincieux (FR); Olivier Guerret, La Tour de Salvagny (FR)

(73) Assignee: COATEX, Genay (FR)

( * ) Notice: Subject to any disclaimer, the term of this patent is extended or adjusted under 35 U.S.C. 154(b) by 549 days.

(21) Appl. No.: 14/220,151

(22) Filed: Mar. 20, 2014

(65) Prior Publication Data

US 2014/0205530 A1 Jul. 24, 2014

Related U.S. Application Data

(62) Division of application No. 12/961,921, filed on Dec. 7, 2010, now abandoned.

(60) Provisional application No. 61/286,455, filed on Dec. 15, 2009.

(30) Foreign Application Priority Data

Dec. 7, 2009 (FR) ...................................... 09 58685

(51) Int. Cl.
*B02C 23/00* (2006.01)
*C09C 1/02* (2006.01)
*C09C 1/36* (2006.01)
*C09C 1/40* (2006.01)
*C01F 11/18* (2006.01)

(52) U.S. Cl.
CPC ............ *B02C 23/00* (2013.01); *C01F 11/185* (2013.01); *C09C 1/021* (2013.01); *C09C 1/36* (2013.01); *C09C 1/40* (2013.01); *C01P 2004/62* (2013.01); *C01P 2006/12* (2013.01); *C01P 2006/60* (2013.01)

(58) Field of Classification Search
None
See application file for complete search history.

(56) References Cited

U.S. PATENT DOCUMENTS

| 2,439,895 A * | 4/1948 | Keats .................... C09C 1/3692 |
| | | 423/615 |
| 3,531,310 A | 9/1970 | Goodspeed et al. |
| 4,204,877 A | 5/1980 | Moorer et al. |
| 4,752,340 A | 6/1988 | Brand et al. |
| 6,039,775 A | 3/2000 | Ho et al. |
| 7,758,888 B2 | 7/2010 | Lapidot et al. |
| 2003/0019162 A1 | 1/2003 | Huang |
| 2006/0272554 A1 | 12/2006 | Jardine et al. |
| 2007/0221764 A1 | 9/2007 | Tran et al. |
| 2008/0287554 A1 | 11/2008 | Gittins et al. |
| 2009/0044725 A1 | 2/2009 | Rainer et al. |
| 2009/0312459 A1 | 12/2009 | Gane et al. |
| 2010/0222484 A1 | 9/2010 | Buri et al. |
| 2012/0237433 A1* | 9/2012 | Gane .................... B03B 1/04 |
| | | 423/430 |
| 2013/0056566 A1 | 3/2013 | Guillot et al. |

FOREIGN PATENT DOCUMENTS

| CN | 1161996 A | 10/1997 |
| CN | 1466618 A | 1/2004 |
| CN | 101503577 A | 8/2009 |
| EP | 0 296 610 A2 | 12/1988 |
| FR | 2 863 914 A1 | 6/2005 |
| FR | 2 896 171 A1 | 7/2007 |
| GB | 1 205 531 A | 9/1970 |
| GB | 2 179 268 A | 3/1987 |
| KR | A-10-2008-0036117 | 4/2008 |
| KR | A-10-2009-0016603 | 2/2009 |
| RU | 2 228 907 C1 | 5/2004 |
| WO | WO 02/17869 A2 | 3/2002 |
| WO | WO 02/17869 A3 | 3/2002 |
| WO | WO 2005/063399 | 7/2005 |
| WO | WO 2005/071003 A1 | 8/2005 |
| WO | WO 2006/100510 A1 | 9/2006 |
| WO | WO 2007/012935 | 2/2007 |
| WO | WO 2007/031870 A1 | 3/2007 |
| WO | WO 2007/109328 A2 | 9/2007 |
| WO | WO 2007/138410 | 12/2007 |

OTHER PUBLICATIONS

Combined Chinese Office Action and Search Report issued Aug. 30, 2013 in Patent Application No. 201080055201.1 (submitting English translation only).
Office Action issued Dec. 2, 2014 in Russian Patent Application No. 2012128517 (submitting English translation only).
Abramzon A.A., "Poverkhnostno-activnye veshcestva: Spravochnik" Surfactants Handbook, 1979, p. 316.
Petrov A.A., "Organicheskaya khimiya" Organic Chemistry, 1973, pp. 202-203.
R. Paramasivam , et al., "Effects of the Physical Properties of Liquid Additives on dry Grinding", Powder Technology, Elsevier Sequoia, XP 000319358, Jan. 1, 1992, pp. 43-50.
Hiroshi Takahashi, "Wet Grinding on Kaolin Minerals", Bulletin of the Chemical Society of Japan, XP002583734, vol. 32, No. 4, 1959, pp. 381-387.
Preliminary Search Report issued May 26, 2010, in French Patent Application No. FA 732985 (with English Translation of Category of Cited Documents).
Office Action issued Aug. 30, 2013, in corresponding Chinese Patent Application No. 201080055201.1 (with English language Translation).
Office Action issued Oct. 30, 2013, in corresponding Korean Patent Application No. 10-2012-7017132 (with English language Translation).

* cited by examiner

*Primary Examiner* — Mark Rosenbaum
(74) *Attorney, Agent, or Firm* — Oblon, McClelland, Maier & Neustadt, L.L.P.

(57) ABSTRACT

The invention consists in the use, as a dry grinding aid agent of a mineral matter chosen from among the dolomites, talc, titanium dioxide, alumina, kaolin and calcium carbonate, the function of which is to reduce the specific grinding energy and to increase the grinding capacity, of formulations containing glycerol.

20 Claims, No Drawings

USE OF FORMULATIONS CONTAINING GLYCEROL AS A DRY GRINDING AID AGENT OF MINERAL MATTER

CROSS REFERENCE TO RELATED APPLICATION

This application is a Division of U.S. application Ser. No. 12/961,921, filed Dec. 7, 2010, now pending; which claims priority to U.S. Provisional Application No. 61/286,455, filed on Dec. 15, 2009, and to French Application No. 09 58685, filed Dec. 7, 2009, all incorporated herein by reference.

FIELD OF THE INVENTION

Offering products which can be produced in a way which is no longer dependent on raw materials derived from fossil energy sources is now a major issue for the chemical industry. This approach is part of the strategy to reduce the rate of volatile organic compounds (VOCs) as defined by the Kyoto Protocol, and is related more generally to the concepts of "green chemistry" and sustainable development.

DISCUSSION OF BACKGROUND

The mineral industry is a large consumer of chemicals. They are used in the various stages of transformation/modification/processing to which mineral matter is subject. Dry grinding of mineral matter, of which natural calcium carbonate represents a special example due to its multiple uses, constitutes one of these steps.

It results from a first "grinding" operation proper, leading to a reduction of the particle size following inter-particle impacts or additional impacts with other materials such as grinding beads. It may also comprise a second step known as "selection", the aim of which is to grade the particles according to their sizes, and notably to reintroduce into the grinder the particles which have not yet reached the desired fineness.

This grinding is undertaken in the presence of agents known as "grinding aid" agents, the function of which is to facilitate the mechanical grinding action as described above. These are introduced during the grinding step, and can be found in the selection step. They are widely found in the documents "Calcium Carbonate" (Birkhäuser Verlag, 2001) and "Beitrag zur Aufklärung der Wirkungsweise von Mahlhilfsmitteln" (Freiberger Forschungshefte, VEB Deutscher Verlag für Grundstoffindustrie, Leipzig, Germany, 1975).

The art is particularly rich on the subject of such additives, which can be classified into 3 categories: the weak Brönstedt acids, the weak Brönstedt bases and the Lewis bases. The first group dedicated to the weak Brönstedt acids notably contains formic, acetic, lactic, lignitic, adipic, lactic acids, the fatty acids and in particular the palmitic and stearic acids, but also certain salts of these acids such as the salts of lignine sulfonate. Illustrations of them are found in documents WO 2005/063399 and FR 2 203 670.

The second group consists of the weak Brönstedt bases; it notably includes alcanolamines, including TIPA (tri isopropanol amine) and TEA (tri ethanol amine), which are well known to the skilled man in the art. With this regard reference may be made to documents EP 0 510 890 and GB 2 179 268.

The Lewis bases constitute the third group of dry grinding aid agents, and contain alcohols. These are ethylene glycol, diethylene glycol, triethylene glycol, propylene glycol and dipropylene glycol. Documents WO 2002/081 573 and US 2003/019 399 describe, for example, the use of diethylene glycol as a dry grinding aid agent in their table 1. Document WO 2005/071 003 makes reference to a polyhydric alcohol, which is ethylene glycol. Document WO 2005/026 252 describes a dry grinding aid agent which may be a triethanolamine, a polypropylene glycol or an ethylene glycol. Finally, document WO 2007/138410 proposes to make use of polyalkylene glycols of low molecular weight.

It must be acknowledged that still, today, these glycol-based products are the ones most commonly used for dry grinding of natural calcium carbonate, of which propylene glycol (or monopropylene glycol) is the most widespread. These additives are, indeed, renowned for their efficiency in facilitating grinding phenomena, and for their low cost; and, indeed, this is reported in document WO 2007/138410 cited above.

However, such products are not free of VOCs. Consequently, calcium carbonate ground with these additives itself carries VOCs, since part of the grinding aid agent remains fixed to/absorbed by the surface of the mineral particle. This VOC content constitutes a barrier to the use of such calcium carbonates in applications in which the regulations no longer tolerate any volatile organic compounds.

A short while ago documents WO 2006/132 762 and WO 2007/109 328 proposed a new dry grinding aid agent: glycerol. This product is derived from the transformation of vegetal or animal oils (saponification, transesterification and synthesis of fatty acids). This is a renewable, natural resource which is available in large quantities. It represents a VOC-free alternative, which is very advantageous from the environmental standpoint and from the standpoint of the preservation of our natural resources, something which polyethylene-glycols (PEG) does not permit, since all of them are derived by means of synthesis.

These last two documents are essentially centred around the dry grinding of cement; this is a process leading to a "coarse" grinding, in the sense that the sizes of the final particles (median diameter) are between 20 and 100 μm, whereas they are of the order of one micron in the case of calcium carbonate. It is therefore unthinkable to transfer the teaching relative to the dry grinding of cement to a method of dry grinding of calcium carbonate: the purpose of the latter is to attain the lower limit of ultra-fine (1 μm) grinding for which approximately 10 times more energy must be expended than for a cement for each dry tonne of ground mineral matter (Rumpf, 1975).

In addition, although both these documents clearly speak of "improvement" of the grinding in the presence of glycerol, they do not explain of what this improvement consists and, above all, in relation to which reference this "improvement" is attested. Finally, no test supports the description and the claimed inventions in either of these documents: it is not therefore possible to apprehend "the technical effect" produced by the claimed products.

Similarly, document U.S. Pat. No. 4,204,877 relative to the use of polyglycerol in the grinding of hydraulic cements or "clinkers" gives no teaching which is transferable to calcium carbonate.

SUMMARY OF THE INVENTION

Continuing their research with a view to providing a dry grinding aid agent for mineral matter, and notably for natural calcium carbonate, the Inventors have successfully identified that the use of formulations containing glycerol or polyglycerol proved particularly advantageous, since they are more effective than propylene glycol with a view to increasing the grinding capacity and reducing the specific consumption of grinding energy (grinding energy proper, but also grading energy) in order to obtain a given granulometry.

This new use is particularly surprising since the publication entitled "Use of a nanoindentation fatigue test to characterise the ductile-brittle transition" (Journal of the European Ceramic Society (2009), 29(6), pp 1021-1028) teaches the skilled man in the art that when calcium carbonate is small in size, and notably of the order of one micron, the grinding causes competition between the plastic deformations of the material and the fractures, the latter being necessary in order to reduce the particle sizes. Since the fractures are favoured when a matter is said to be "fragile", the skilled man in the art with the mission of finely grinding a calcium carbonate will seek additives which assist with its embrittlement. And the publication entitled "Hardness reduction through wetting" of the authors R. W. Heinz and N. Street (Technical Note, Society of Mining Engineering, June 1964, pages 223-224) clearly indicates in Table 1 that glycerol significantly decreases the hardness of limestone.

In addition, the use of glycerol has the equally unexpected advantage that it does not react with CaO and $Ca(OH)_2$, concerning which the Inventors consider that they are formed on the surface of the carbonate material, resulting in the fact that this dry grinding agent used according to the invention does not change colour. In fact, it leads to no, or a minimum of, yellowing of the calcium carbonate with which it is ground, whereas a yellowing appears in the case of grinding with monopropylene glycol (MPG).

The term "specific grinding energy" signifies the total quantity of energy expressed in kWh required to grind a tonne of dry calcium carbonate. The term "grinding capacity" signifies the mass of dry calcium carbonate ground each hour. It is understood that both these magnitudes are determined, in the context of the invention, "at the limits" of the overall method of dry grinding of calcium carbonate: i.e. by incorporating both the grinding steps proper, followed by that of selection. One of the original aspects of the present invention is precisely that the grading step, which is often overlooked when phenomena of grinding of mineral matter are addressed, is taken into account.

For its part, "granulometry" refers to the median diameter d50 (µm) determined by a Sedigraph™ 5100 device sold by the company MICROMERITICS™, while the specific area ($m^2/g$) is measured according to the BET method well known to the skilled man in the art.

According to the present invention the Inventors understand by "dry grinding" a grinding in a grinding unit with a quantity of water less than 10% by dry weight of the said material in the said grinding unit.

Nothing in the state of the art, and notably in documents WO 2006/132 762 and WO 2007/109 328, disclosed or suggested that formulations containing glycerol,
  relative to monopropylene glycol (MPG) or polyethylene glycol (PEG), which constitute the market reference in accordance with the necessities of limiting VOCs, notably in terms of efficacy of grinding of calcium carbonate,
  used in the same quantity, in the course of a method for dry grinding of calcium carbonate,
led to a reduction of the specific grinding energy and to an increase of the grinding capacity (where both these magnitudes are determined taking into account both the grinding steps proper and that of selection), with a view to obtaining a given granulometry of the order of 1 µm (i.e. a median diameter d50 well below that obtained for dry grinding of cement).

DETAILED DESCRIPTION

The first object of the invention therefore lies in the use, as a dry grinding aid agent of a mineral matter chosen from among the dolomites, talc, titanium dioxide, alumina, kaolin and calcium carbonate, the function of which is to reduce the specific grinding energy and to increase the grinding capacity, of formulations comprising:
  (i) glycerol, in an aqueous or pure form, or
  (ii) glycerol with one or more of the following agents: ethylene glycol, monopropylene glycol, triethylene glycol, an inorganic acid or an inorganic acid salt, formic or citric acid or a formic or citric acid salt, an organic polyacid or an organic polyacid salt, an alcanolamine, a poly(ethylene imine), a polyalkylene glycol polymer of molecular mass by weight of between 200 g/mole and 20,000 g/mole, preferentially between 600 g/mole and 6,000 g/mole, a carbohydrate having a root mean square of the radius of gyration equal to or less than the modal radius of the mineral matter, one or more polyglycerols, where the said agent or agents are in the aqueous or pure form,
  (iii) one or more polyglycerols in aqueous or pure form.

The expression "in the pure form" signifies that the formulation containing the product in question contains no other product.

Another characteristic of this use resides in the fact that the Gardner colour index of the dry grinding aid agent has a value of less than 3 measured according to the Gardner DIN ISO4630/ASTM D 1544 68 method, expressed in a scale from 1 (colourless) to 20 (very dark brown).

This use also enables the yellowing of the ground product to be prevented, and notably leads to a ground product with a change of degree of whiteness of less than 1% relative to the initial degree of whiteness according to the TAPPI T452 ISO2470 standard.

This use may be presented as 5 variants, depending on the form and nature of the grinding aid agent:
  first variant: glycerol in the pure form
  second variant: glycerol in an aqueous formulation
  third variant: glycerol in combination with at least one of the compounds set out in point (ii), in the aqueous or pure form
  fourth variant: at least one polyglycerol in the pure form
  fifth variant: at least one polyglycerol in an aqueous formulation.

In a first variant this use is also characterised in that the said formulations consist of glycerol in the pure form.

In a second variant this use is also characterised in that the said formulations consist of water and glycerol.

According to this second variant, this use is also characterised in that the said formulations contain 25% to 95%, preferentially 45% to 90%, and very preferentially 75% to 85%, by weight of glycerol relative to their total weight, the remainder consisting of water.

In a third variant this use is also characterised in that the said formulations consist of glycerol with one or more of the said agents, in the aqueous or pure form.

According to this third variant, this use is also characterised in that the said inorganic acid is a phosphoric acid.

According to this third variant, this use is also characterised in that the said inorganic salt is a mono-, di- or tri-alkaline salt, and is preferentially a salt of a cation of Group I or II of the Periodic Table of the Elements.

According to this third variant, this use is also characterised in that the said salt of formic or citric acid is a mono-, di- or tri-alkaline salt, and is preferentially a salt of a cation of Group I or II of the Periodic Table of the Elements.

According to this third variant, this use is also characterised in that the said organic polyacid has the formula COOH—$(CH_2)_n$—COOH, in which n is an integer having a value of between 0 and 7, inclusive, or is a mono- or di-alkaline salt of the organic polyacid of formula COOH—$(CH_2)n$—COOH, in which n is equal to an integer having a value of between 0 and 7 inclusive, or is a polymeric organic polyacid of one or more of the following monomers, in the acid form, or in the form which is partially or fully neutralised with one or more cations of Group I or II of the Periodic Table of the Elements: acrylic, methacrylic, maleic or itaconic, and is preferentially an oxalic acid, a pimelic acid or an adipic acid.

According to this third variant, this use is also characterised in that the said alcanolamine is chosen from among 2-amino-2-methyl-1-propanol, 2-amino-2-ethyl-1,3-propanediol, tri-ethanolamine, N-butyldiethanolamine and tri-iso-propanolamine, whether or not neutralised, and is preferentially chosen from among their forms which are neutralised by means of a formic or citric acid salt, or of an organic polyacid salt.

According to this third variant, this use is also characterised in that the said polyalkylene glycol polymer is a polyethylene glycol, a polypropylene glycol, or an ethylene-propylene glycol copolymer, whether random or block.

According to this third variant, this use is also characterised in that the said carbohydrate having a root mean square of the radius of gyration of the said carbohydrate equal to or less than the modal radius of the mineral matter is glucose, fructose, sucrose, starch or cellulose, and is preferentially sucrose.

According to this third variant, this use is also characterised in that the polyglycerol or polyglycerols are chosen from among di-glycerol, tri-glycerol, tetra-glycerol, penta-glycerol, hexa-glycerol, hepta-glycerol, octa-glycerol, nona-glycerol and deca-glycerol and their blends, and preferentially from among di- and tri-glycerol.

According to this third variant, this use is also characterised in that the said formulations contain 20% to 95% by weight of glycerol, 1% to 50% by weight of the said agent and 0% to 65% by weight of water, preferentially 30% to 90% by weight of glycerol, 10% to 45% by weight of the said agent and 0% to 60% by weight of water, and preferentially 35% to 75% by weight of glycerol, 30% to 40% by weight of the said agent and 5% to 50% by weight of water, relative to their total weight, where the sum of the percentages by weight of glycerol, of the said agent and of water are, in each case, equal to 100%.

According to a fourth variant, this use is also characterised in that the said formulations consist of one or more polyglycerols in the pure form.

According to this fourth variant, this use is also characterised in that the polyglycerol or polyglycerols are chosen from among di-glycerol, tri-glycerol, tetra-glycerol, penta-glycerol, hexa-glycerol, hepta-glycerol, octa-glycerol, nona-glycerol and deca-glycerol and their blends, and preferentially from among di- and tri-glycerol.

According to a fifth variant, this use is also characterised in that the said formulations consist of water and one or more polyglycerols.

According to this fifth variant, this use is also characterised in that the said formulations contain 25% to 95%, preferentially 45% to 90%, and very preferentially 75% to 85%, by weight of polyglycerols relative to their total weight, the remainder consisting of water.

According to this fifth variant, this use is also characterised in that the polyglycerol or polyglycerols are chosen from among di-glycerol, tri-glycerol, tetra-glycerol, penta-glycerol, hexa-glycerol, hepta-glycerol, octa-glycerol, nona-glycerol and deca-glycerol and their blends, and preferentially from among di- and tri-glycerol.

Generally, this use is also characterised in that use is made of 100 to 5,000 ppm, and preferentially 500 to 3,000 ppm, of glycerol or polyglycerol, relative to the dry weight of the said mineral matter.

Generally, this use is also characterised in that use is made of between 0.1 and 1 mg, and preferentially between 0.2 and 0.6 mg, total dry equivalent, of the said glycerol or polyglycerol and every possible agent for each $m^2$ of mineral matter.

Generally, this use is also characterised in that the said mineral matter is ground as far as an average diameter, measured by a Sedigraph™ 5100, of between 0.5 and 10 μm, and preferentially between 1 μm and 5 μm.

Generally, this use is also characterised in that the said mineral matter is ground until a percentage by weight of particles having a diameter of less than 2 μm, measured by a Sedigraph™ 5100, of between 20% and 90%, and preferentially between 30% and 60%, is obtained.

Generally, this use is also characterised in that the said mineral matter is a natural calcium carbonate.

The following examples enable the invention to be better understood, without however limiting its scope.

EXAMPLES

Example 1

This example is relative to the dry grinding of a natural calcium carbonate which is a Carrara marble. The grinding is undertaken by means of an installation fitted with a ball-mill and a classifier.

It illustrates the improvement of the production capacity (expressed in tonnes of dry minerals ground per hour) and of the specific grinding energy applied, in the case of a dry grinding agent which is glycerol, compared to two grinding aid agents of the art, which are a monopropylene glycol and a polyethylene glycol.

The distribution of the particle sizes of the initial calcium carbonate fed into the grinder, obtained by pre-grinding in a hammer mill, is given in table 1.

TABLE 1

| Diameter of particles (mm) | % by mass |
| --- | --- |
| 4-2.5 | 7.25 |
| 2.5-1.6 | 9.73 |
| 1.6-0.8 | 11.44 |
| 0.8-0.5 | 5.57 |
| 0.5-0.2 | 23.73 |
| 0.2-0.1 | 23.18 |
| <0.1 | 19.1 |

The Carrara marble was introduced into a ball-mill of capacity 5.7 $m^3$ using 8 tonnes of Cylpeb™ iron grinding beads, in the form of cylinders, having an average diameter of 16 mm, with a view to obtaining a ground material:
  having a median diameter less than or equal to 1.8 μm,
  55% by weight of the particles of which have a diameter of less than or equal to 2 μm.
The dry grinding is undertaken continuously.

When it leaves the grinding chamber the ground material is conveyed to a classifier of the SELEX™ 6S type. Its rotational speed and its air flow rate are set respectively at 5,200 revolutions/min. and 6,000 m³/h, so as to select that portion of particles having an average diameter less than or equal to a given value, and which will constitute the finished product; the portion of remaining particles having an average diameter greater than this value is reintroduced into the ball-mill.

The grinding is undertaken in such a way that the selector's feed rate is always equal to 4 tonnes/h, and that the quantity of fresh product injected into the ball-mill matches the quantity of selected product leaving the system.

After starting the system, and before recording the results which are indicated below, the system is operated until stable values are obtained for the quantity of ground material, the grinding capacity and the grinding energy.

The dry grinding aid agents were introduced into the grinding system in the area of the point where the fresh material is introduced, in such a way as to maintain a constant quantity of grinding aid agent relative to the fresh material introduced for grinding.

TABLE 2

|  | Test n° | | | |
| --- | --- | --- | --- | --- |
|  | 1 Art | 2 Art | 3 Invention | 4 Invention |
| Type of grinding aid agent | MPG | PEG | Glycerol | Glycerol + H3PO4 |
| Production capacity (tonnes/h) | 0.68 | 0.65 | 0.70 | 0.68 |
| Specific grinding energy (kWh/t) | 106 | 112 | 103 | 106 |
| Specific grading energy (kWh/t) | 166 | 172 | 160 | 171 |
| Global specific energy (kWh/t) | 271 | 284 | 263 | 277 |
| % of particles of diameter <2 μm | 57 | 57 | 57 | 58 |
| % of particles of diameter <1 μm | 22 | 21 | 23 | 23 |
| d50 (μm) | 1.8 | 1.8 | 1.7 | 1.7 |
| BET specific area (m²/g) | 6.3 | 6.9 | 6.9 | 7.2 |
| Gardner yellow index | 5 | 1 to 2 | 1 to 2 | 1 to 2 |

The grinding aid agents referenced MPG consist of an aqueous solution containing 75% (by mass) of monopropylene glycol, and were obtained from the company FLUKA™.

The grinding aid agents referenced EG consist of ethylene glycol, and were obtained from the company FLUKA™.

The grinding aid agents referenced PEG consist of an aqueous solution containing 75% (by mass) of polyethylene glycol of molecular mass by weight equal to 600 g/mole and were obtained from the company FLUKA™.

Glycerol designates an aqueous solution containing 75% (by mass) of glycerol.

Glycerol+H3PO4 designates an aqueous solution containing 75% (by mass) of a blend (99/1 by mass) of glycerol/phosphoric acid.

Each of the tests uses 2,000 ppm of active product (or 2,667 ppm of each aqueous solution).

The Gardner yellow index of the grinding agent is measured according to the DIN ISO 4630/ASTM D 1544 68 standard, and the value is expressed in a scale ranging from 1 (colourless) to 20 (very dark brown), where the value 1 to 2 signifies almost colourless, the value 5 signifies a yellow colour 5, while the value 11 signifies a brown colour.

All else being equal, the lower the Gardner yellow index for the grinding aid agent, the higher will be the final yellowing observed in the calcium carbonate after grinding. It is observed already that test 1, which uses monopropylene glycol, proves to have a very high value for the Gardner index: in respect solely of the problem of yellowing, the grinding aid agents used in the other tests will therefore be preferred over it.

Since the only "acceptable" grinding aid agents are those corresponding to tests 2, 3 and 4, their performances must therefore be examined. It appears that the best results are obtained for tests 3 and 4: increased production capacity, reduced specific grinding energy, reduced specific grading energy, for particles which are finer than according to the art (reduced value of d50).

To summarise, only the polymers according to the invention allow reduced yellowing, whilst satisfying the following functions in terms of the grinding method:
improved production capacity,
reduced production energy (both for grinding, but also for grading),
with a view to obtaining a fine grade of calcium carbonate.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A method, comprising dry grinding a mineral matter selected from dolomite, talc, titanium dioxide, alumina, kaolin and calcium carbonate in the presence of a dry grinding agent, wherein said dry grinding agent comprises, in aqueous or pure form:
   (i) 100 to 5,000 ppm of glycerol relative to the dry weight of said mineral matter, or
   (ii) 100 to 5,000 ppm of glycerol relative to the dry weight of said mineral matter and one or more of the following supplemental agents: ethylene glycol, monopropylene glycol, triethylene glycol, an inorganic acid or an inorganic acid salt, formic or citric acid or a formic or citric acid salt, an organic polyacid or an organic polyacid salt, an alkanolamine, a poly(ethylene imine), a polyalkylene glycol polymer of molecular mass by weight of 200 g/mole-20,000 g/mole, a carbohydrate having a root mean square of the radius of gyration equal to or less than the modal radius of the mineral matter, and one or more polyglycerols, or (iii) 100 to 5,000 ppm of one or more polyglycerols relative to the dry weight of said mineral matter.

2. The method according to claim 1, wherein the Gardner colour index of the dry grinding aid agent has a value of less than 3 measured according to the Gardner DIN ISO4630/ASTM D 1544 68 method, expressed in a scale from 1 (colourless) to 20 (very dark brown).

3. The method according to claim 1, wherein said dry grinding aid agent consists of glycerol in pure form.

4. The method according to claim 1, wherein said dry grinding aid agent consists of glycerol in an aqueous form.

5. The method according to claim 4, wherein said dry grinding aid agent consists of 25% to 95% by weight of glycerol relative to the total weight of the dry grinding aid agent, the remainder consisting of water.

6. The method according to claim 1, wherein said dry grinding aid agent consists of glycerol and one or more of said supplemental agents, in aqueous or pure form.

7. The method according to claim 6, wherein said supplemental agent is an inorganic acid and said inorganic acid is a phosphoric acid.

8. The method according to claim 6, wherein said supplemental agent is an inorganic salt and said inorganic salt is a mono-, di- or tri-alkaline salt.

9. The method according to claim 6, wherein said supplemental agent is a salt of formic or citric acid and said salt of formic or citric acid is a mono-, di- or tri-alkaline salt.

10. The method according to claim 6, wherein said supplemental agent is an organic polyacid and said organic polyacid has the formula COOH—$(CH_2)_n$—COOH, in which n is an integer having a value of between 0 and 7, inclusive, or is a mono- or di-alkaline salt of the organic polyacid of formula COOH—$(CH_2)$n-COOH, in which n is equal to an integer having a value of between 0 and 7 inclusive, or is a polymeric organic polyacid of one or more of the following monomers, in the acid form, or in the form which is partially or fully neutralised with one or more cations of Group I or II of the Periodic Table of the Elements, acrylic, methacrylic, maleic or itaconic, or is an oxalic acid, a pimelic acid or an adipic acid.

11. The method according to claim 6, wherein said supplemental agent is an alkanolamine and said alkanolamine is selected from 2-amino-2-methyl-1-propanol, 2-amino-2-ethyl-1,3-propanediol, tri-ethanolamine, N-butyldiethanolamine and tri-iso-propanolamine, which are optionally neutralized by formic or citric acid salt, or by an organic polyacid salt.

12. The method according to claim 6, wherein said supplemental agent is a polyalkylene glycol polymer and said polyalkylene glycol polymer is a polyethylene glycol, a polypropylene glycol, or an ethylene-propylene glycol copolymer, in random or block form.

13. The method according to claim 6, wherein said supplemental agent is a carbohydrate having a root mean square of the radius of gyration of the said carbohydrate equal to or less than the modal radius of the mineral matter, and said carbohydrate having a root mean square of the radius of gyration of the said carbohydrate equal to or less than the modal radius of the mineral matter is glucose, fructose, sucrose, starch or cellulose.

14. The method according to claim 6, wherein said supplemental agent is at least one polyglycerol selected from di-glycerol, tri-glycerol, tetra-glycerol, penta-glycerol, hexa-glycerol, hepta-glycerol, octa-glycerol, nona-glycerol and deca-glycerol.

15. The method according to claim 1, wherein said dry grinding aid agent consists of one or more polyglycerols in pure form.

16. The method according to claim 15, wherein said polyglycerols are selected from di-glycerol, tri-glycerol, tetra-glycerol, penta-glycerol, hexa-glycerol, hepta-glycerol, octa-glycerol, nona-glycerol and deca-glycerol.

17. The method according to claim 1, wherein said dry grinding aid agent consists of one or more polyglycerols in aqueous form.

18. The method according to claim 17, wherein said polyglycerols are selected from di-glycerol, tri-glycerol, tetra-glycerol, penta-glycerol, hexa-glycerol, hepta-glycerol, octa-glycerol, nona-glycerol and deca-glycerol.

19. The method according to claim 1, wherein said mineral matter is ground to a particle size of 0.5-10 μm.

20. The method according to claim 1, wherein said dry grinding agent comprises, in aqueous or pure form:

(i) 500 to 3,000 ppm of said glycerol relative to the dry weight of said mineral matter, or (ii) 500 to 3,000 ppm of said glycerol relative to the dry weight of said mineral matter and said one or more supplemental agents, or (iii) 500 to 3,000 ppm of said one or more polyglycerols relative to the dry weight of said mineral matter.

* * * * *